July 28, 1936.  W. J. FIEGEL ET AL  2,048,789

VALVE ASSEMBLY

Filed May 18, 1931  3 Sheets-Sheet 1

INVENTORS
William J. Fiegel
Winfield S. Enderich

BY

*Whittemore Hulbert Whittemore & Belknap*

ATTORNEYS

July 28, 1936.  W. J. FIEGEL ET AL  2,048,789

VALVE ASSEMBLY

Filed May 18, 1931  3 Sheets-Sheet 2

INVENTORS
William J. Fiegel
Winfield S. Enderich
BY
Whittemore, Hulbert, Whittemore & Belknap
ATTORNEYS July 28, 1936.  W. J. FIEGEL ET AL  2,048,789
VALVE ASSEMBLY
Filed May 18, 1931  3 Sheets-Sheet 3

INVENTORS
William J. Fiegel
Winfield S. Enderich
BY
W Lattemore Hulbut W Lattemore Belknap
ATTORNEYS Patented July 28, 1936

2,048,789

UNITED STATES PATENT OFFICE 2,048,789

VALVE ASSEMBLY

William J. Fiegel and Winfield S. Enderich, Detroit, Mich., assignors to Bohn Aluminum and Brass Corporation, Detroit, Mich., a corporation of Michigan Application May 18, 1931, Serial No. 538,386

2 Claims. (Cl. 121—46.5)

This invention relates generally to valve constructions and more particularly to valve mechanisms especially designed for use in hydraulic systems of the character disclosed in the Fiegel Patent No. 1,915,656.

One of the principal objects of this invention is to provide an improved valve mechanism which is simple in construction and is so designed as to reduce back pressures in a hydraulic system to a minimum.

Further objects of this invention will be made more apparent as this description proceeds, especially when considered in connection with the accompanying drawings, wherein.

Figure 1:
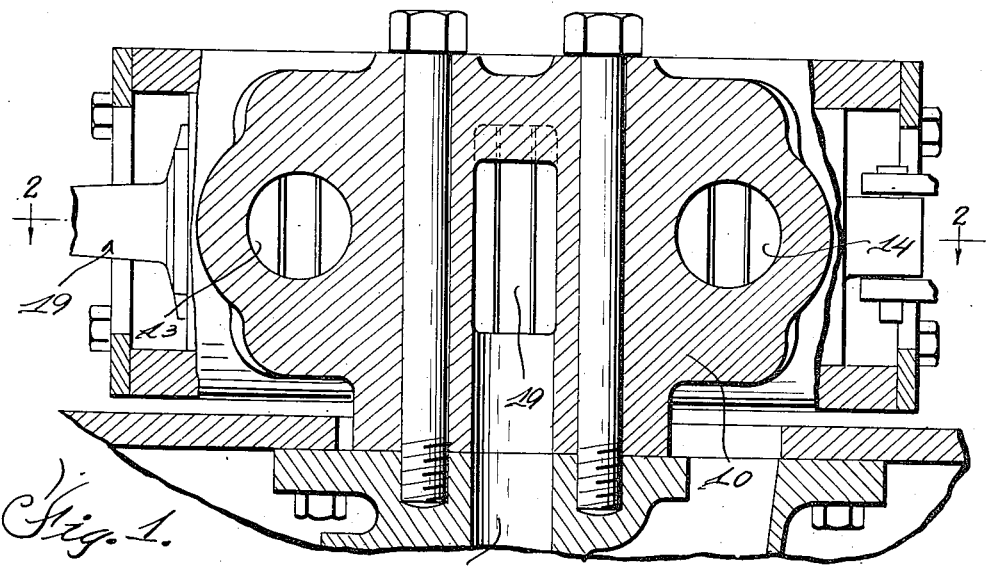
Figure 1 is a sectional side elevational view of a valve constructed in accordance with this invention and taken substantially on the line 1—1 of Figure 2.

In general, our improved valve mechanism illustrated in the several figures of the drawings comprises a casing 10 having an inlet opening 11 and an exhaust opening 12, both communicating with a source of supply (not shown), but which may be in the form of a lubricant reservoir of the type shown in the Fiegel Patent No. 1,915,656. The intake opening 11 preferably communicates with the source of supply through the medium of a pressure pump (not shown), but may be of the type also disclosed in the above identified patent enabling fluid to be forced into the valve casing under pressure. Arranged upon opposite sides of the inlet opening 11 within the casing 10 is a pair of chambers 13 and 14 having openings 15 and 16, respectively, communicating with the points of distribution through suitable conduits 17 and 18. Mounted for reciprocation within the casing 10 between the inlet and outlet openings 11 and 12 is a piston type valve member 19 having a portion of the periphery thereof recessed to form with the adjacent inner walls of the casing an annular passage 20. The annular passage 20 is so proportioned that in any one of the various positions of the valve, the same is in communication with the inlet opening 11 and is adapted to alternatively establish communication between the latter opening and the openings 15 and 16, respectively. As will be more fully hereinafter set forth, the above arrangement is such that when the valve 19 is in the position shown in Figure 3, the annular passage 20 establishes communication between the inlet opening 11 and the chamber 14 through an intake port 21 in the inner wall of the chamber. The fluid entering the chamber 14 as above indicated is discharged through the opening 16 to the point or points of distribution. On the other hand, when the piston valve member 19 is in the position shown in Figure 4, the annular passage 20 establishes communication between the inlet opening 11 and the chamber 13 through an intake port 22 formed in the inner wall of the latter chamber with the result that fluid entering the chamber 13 in the above manner is discharged through the opening 15. Movement of the valve piston 19 to the various positions of adjustment previously set forth may be accomplished either automatically or manually depending largely upon the particular installation.

Figure 2:
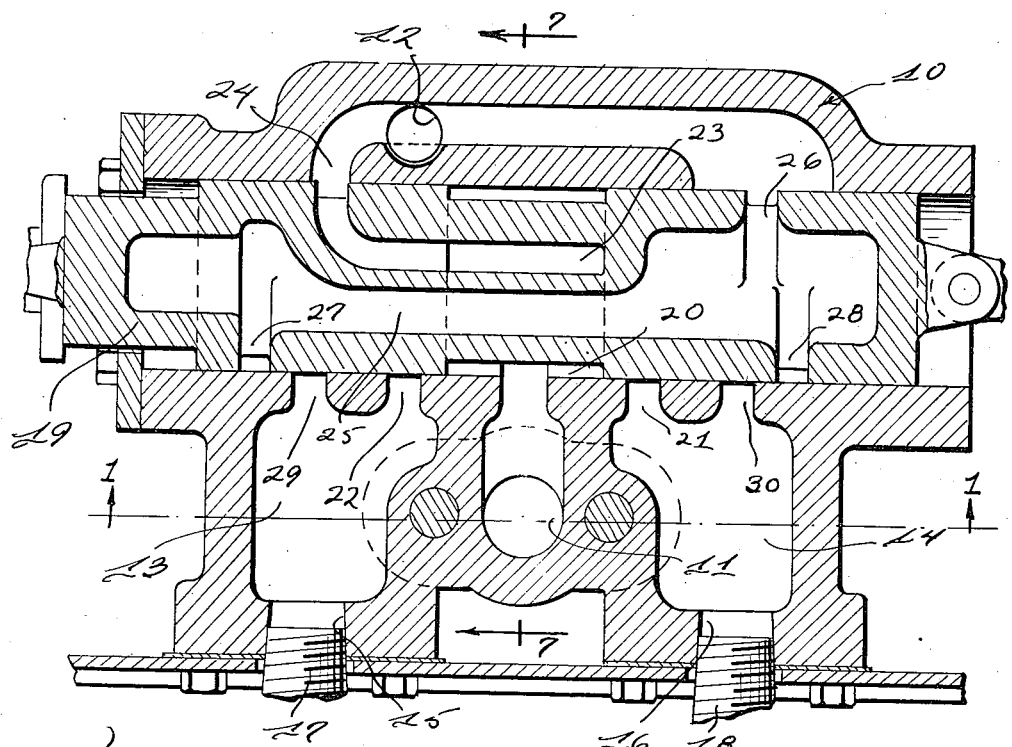
Figure 2 is a longitudinal sectional view taken substantially on the line 2—2 of Figure 1.

The valve piston 19 is provided with another passage 23 having one end communicating with the annular passage 20 and having the opposite end adapted to communicate with an exhaust passage 24 in the casing which in turn communicates with the exhaust opening 12. As shown in Figure 2, the parts of the valve are so designed that when the passage 23 is in communication with the passage 24, the annular passage 20 will assume a position out of communication with either of the ports 21 and 22 with the result that all of the fluid entering the valve will flow through the passages 20, 23 and 24 into the outlet opening 12 and back to the reservoir. In other words, when the valve piston 19 is in its normal position, all of the fluid flowing into the valve will be discharged through the outlet opening 12 back into the reservoir (not shown). The valve piston 19 is provided with still another passage 25 extending longitudinally of the valve piston substantially for the full length thereof and arranged out of communication with the passages 20 and 23. The passage 25 communicates at all times with the exhaust passage 24 in the casing through an exhaust port 26 and is provided with additional ports 27 and 28 arranged to alternatively register with exhaust ports 29 and 30 formed in the chambers 13 and 14, respectively, for establishing communication between the latter and passage 25.

Figure 3:
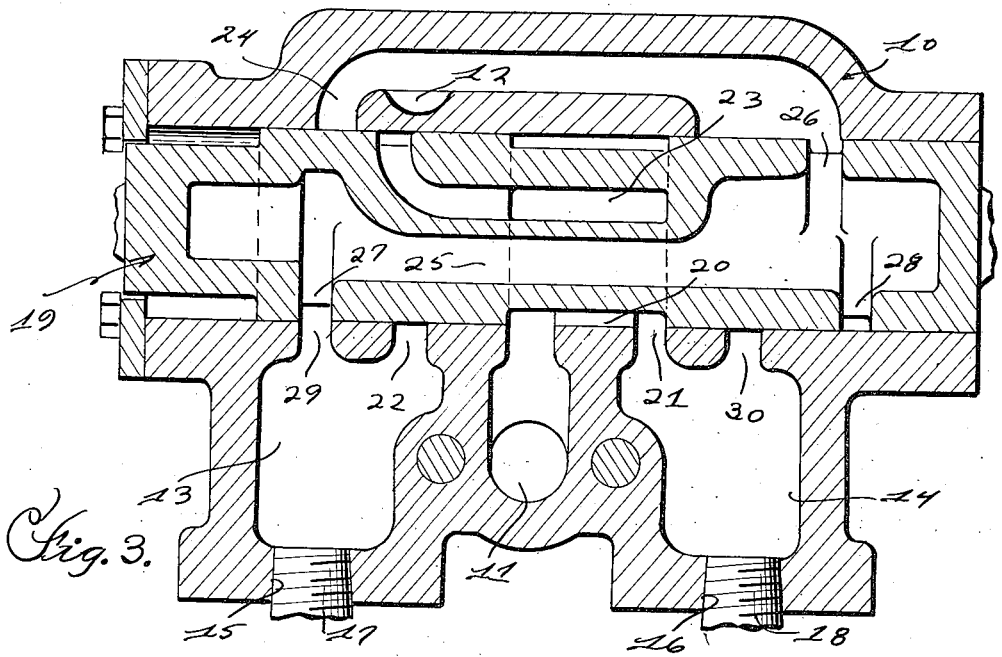
Figures 3 and 4 are views similar to Figure 2 showing the valve in different positions.

Referring now to the operation of the valve mechanism hereinbefore described and assuming for the purpose of illustration that the openings 15 and 16 in the valve casing respectively communicate with opposite ends of a cylinder (not shown) for reciprocating a piston within the cylinder, it will be noted that when the parts of the valve mechanism are in the position illustrated in Figure 3, fluid under pressure flows into the casing through the inlet opening 11 is discharged into the chamber 14 through the inlet port 21. The fluid flows from the chamber 14 through the opening 16 into one end of the cylinder for moving the piston in one direction. When the parts are in the above position, it will be apparent from Figure 3 that the inlet opening 22 for the chamber 13 and the exhaust opening 30 for the chamber 14 are closed by the piston valve and further that the exhaust opening 29 for the chamber 13 is in communication with the port 27 with the result that the fluid in the cylinder ahead of the piston is discharged into the chamber 13 through the opening 15 and through the ports 29 and 27 into the passage 25 in the piston valve and since the port 26 in the latter is always in communication with the passage 24 in the casing, it will be apparent that the exhaust fluid will be discharged through the passage 24 into the exhaust opening 12.

Figure 4:
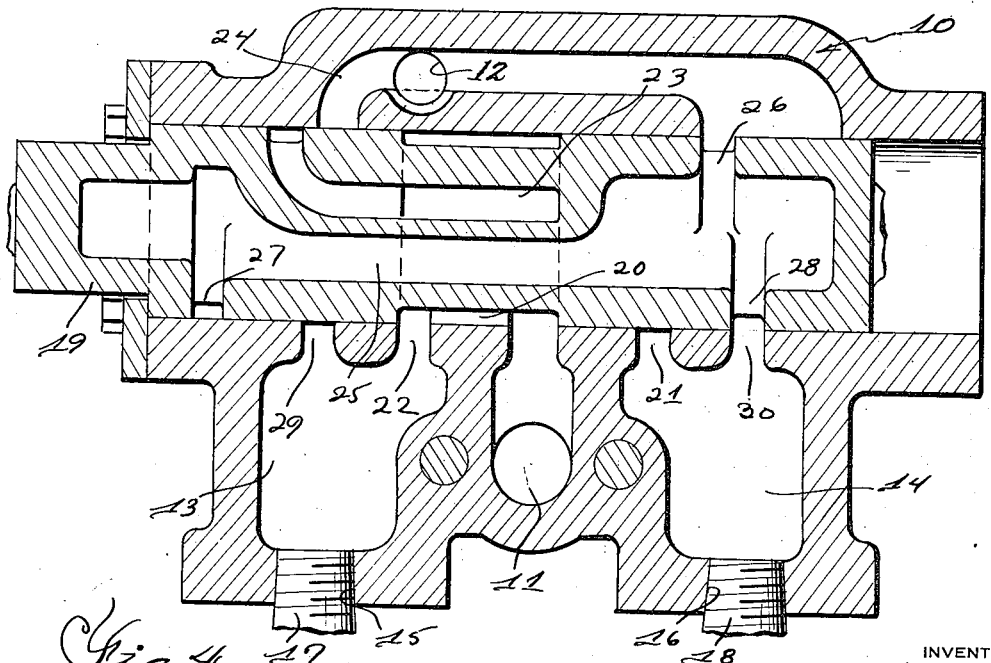

When, on the other hand, the piston valve 19 is moved to its other extreme position as shown in Figure 4, the annular passage 20 in the piston valve establishes communication between the inlet opening 11 and the inlet port 22 for the chamber 13 so that fluid flowing through the passage 11 will be directed into the chamber 13 and discharged through the opening 15 into the opposite end of the cylinder to move the piston therein in a direction opposite to the one hereinbefore referred to. When the valve is in the latter position, it will be observed from Figure 4 that the exhaust port 29 for the chamber 13 is closed by the piston valve and the exhaust port 30 for the chamber 14 is registered with the exhaust port 28 in the piston valve with the result that the fluid exhausted from the cylinder by the piston will be discharged into the chamber 14 and through the ports 30 and 28 into the passage 25 in the piston valve. From the passage 25, the fluid is caused to flow through the exhaust opening 26 into the passage 24 in the casing and since the latter passage communicates with the outlet opening 12, it necessarily follows that the exhaust fluid will be directed back to the reservoir (not shown) through the latter opening. Attention at this point is directed to the fact that the annular passage 20 in the periphery of the piston valve communicates with the inlet port 11 during reciprocation of the valve member and in all positions of the latter. It is to be understood that in the two above mentioned positions of the valve member, the passage 23 is out of communication with the exhaust opening 12 and since this passage is in continuous communication with the annular passage 20, which in turn is continuously in communication with the inlet opening 11, it follows that relatively high pressures may build up in the passage 23 tending to deflect the walls of the piston valve outwardly and thereby impede reciprocation thereof. However, since the annular passage 20 surrounds portions of the valve member opposite the passage 23, it will be apparent that the fluid continuously flowing through this passage under pressure of the pump will build up a pressure between the casing and periphery of the valve member which will counteract any tendency for the pressures in the valve member to deflect the walls of the latter as previously pointed out.

Figure 5:
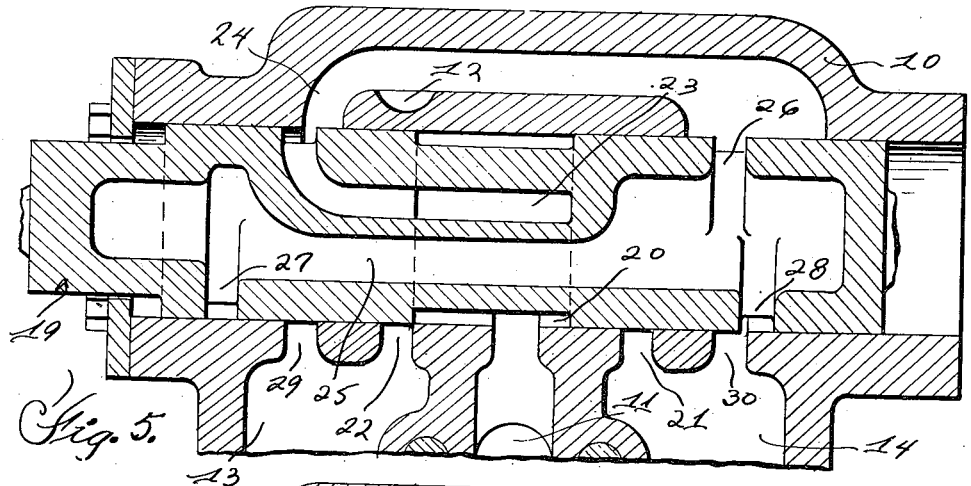
Figures 5 and 6 are views similar to Figures 3 and 4 showing the valve mechanism in still other positions.
Figure 6:
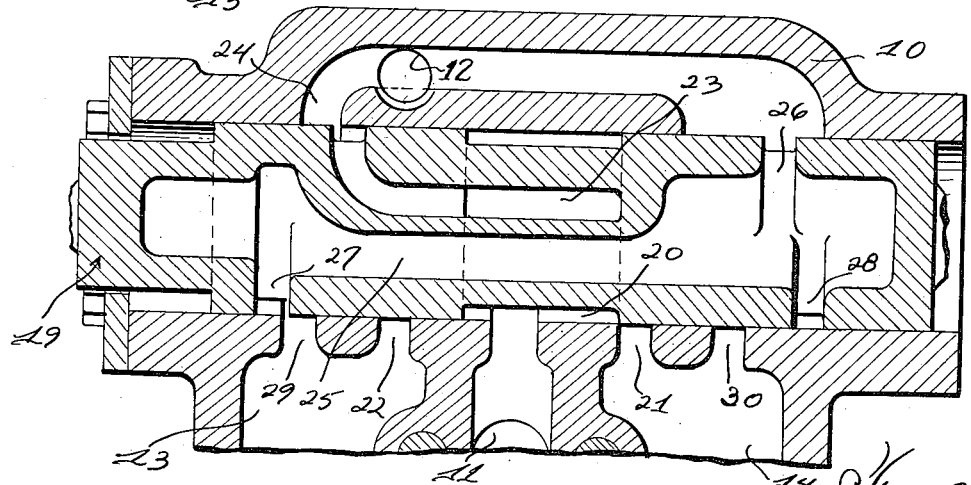
Figure 7:
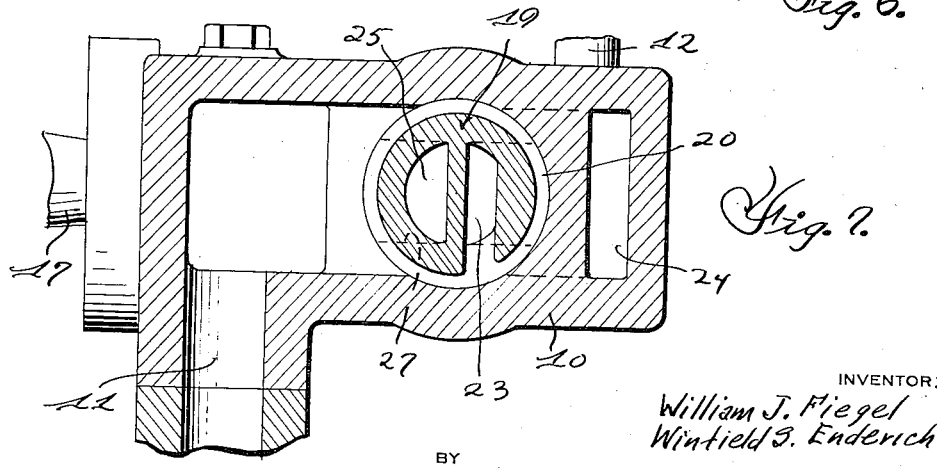
Figure 7 is a sectional view taken substantially on the line 7—7 of Figure 2.

As previously stated, it is one of the objects of this invention to reduce back pressures in the fluid system to a minimum. The foregoing is accomplished in the present instance by designing the valve mechanism in such a manner that reciprocation of the piston valve will cause the exhaust ports for the chambers 13 and 14 to open prior to the intake ports. Assuming that the parts of the valve mechanism are in the position shown in Figure 3 and that the piston valve member 19 is moved to the position illustrated in Figure 5, it will be noted that the exhaust opening 30 for the chamber 14 will open prior to the intake opening 22 for the chamber 13. Likewise when the valve is moved to the position shown in Figure 6, the exhaust opening 29 for the chamber 13 opens prior to the intake opening 21 for the chamber 14 when the piston valve 19 is moved from the position illustrated in Figure 4 to the position shown in Figure 3. The foregoing arrangement is especially desirable when the valve is employed for controlling the flow of fluid to a cylinder for reciprocating a piston therein since it insures relieving the pressure at the high side of the piston prior to admitting fluid pressure to the cylinder at the low side of the piston, and, as a consequence, prevents any tendency for back pressures to build up in the system.

What we claim as our invention is:

1. A valve assembly comprising a casing having an inlet opening intermediate the ends thereof and having an exhaust opening spaced from the inlet opening, said casing further having intake and exhaust ports on opposite sides of the inlet opening, a valve member reciprocably mounted in the casing and having a recess in the periphery thereof cooperating with the adjacent portions of the casing to form an annular passage proportioned to communicate with the inlet opening in all positions of the valve member and operable in one position of said valve member to communicate with one of the intake ports and in another position of the valve member to communicate with the other intake port, said valve member having a chamber therein provided with an exhaust opening communicating with the exhaust opening in the casing in all positions of the valve member and in addition having spaced exhaust ports predeterminedly located to alternately communicate with the said exhaust ports on opposite sides of the intake opening in the second and first named positions of the valve member, and a second passage in said valve member establishing communication between the annular passage and exhaust opening in the casing when said valve member is in a neutral position.

2. A valve assembly comprising a casing having an inlet opening for fluid under pressure and having an exhaust opening spaced from the inlet opening, said casing further having intake and exhaust ports arranged in pairs in predetermined spaced relation to the inlet opening, a valve member slidably mounted in the casing and having a recess in the periphery thereof co-operating with the adjacent portions of the casing to form an annular passage proportioned to communicate with the inlet opening in all positions of the valve member and operable in one position of said valve member to communicate with one of the intake ports and in another position of said valve member to communicate with the other intake port, said valve member having a chamber therein provided with an exhaust opening communicating with the exhaust opening in the casing and also having spaced exhaust ports predeterminedly located to alternately communicate with the exhaust ports in the casing in the second and first named positions of the valve member, and a second passage in the valve member establishing communication between the annular passage and exhaust opening in the casing when the valve member is in a neutral position.

WILLIAM J. FIEGEL.
WINFIELD S. ENDERICH.